US011816331B2

(12) United States Patent
Tajima et al.

(10) Patent No.: US 11,816,331 B2
(45) Date of Patent: Nov. 14, 2023

(54) STORAGE SYSTEM AND STORAGE PROGRAM UPDATE METHOD

(71) Applicant: Hitachi, Ltd., Tokyo (JP)

(72) Inventors: Sachie Tajima, Tokyo (JP); Shintaro Ito, Tokyo (JP); Takahiro Yamamoto, Tokyo (JP); Yoshinori Ohira, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 17/693,109

(22) Filed: Mar. 11, 2022

(65) Prior Publication Data

US 2023/0176732 A1    Jun. 8, 2023

(30) Foreign Application Priority Data

Dec. 2, 2021    (JP) .................................. 2021-196415

(51) Int. Cl.
*G06F 3/06*    (2006.01)

(52) U.S. Cl.
CPC ............ *G06F 3/0607* (2013.01); *G06F 3/0613* (2013.01); *G06F 3/0632* (2013.01); *G06F 3/067* (2013.01)

(58) Field of Classification Search
CPC ..... G06F 3/0607; G06F 3/0613; G06F 3/0632; G06F 3/0634; G06F 3/067; G06F 9/445; G06F 9/44536
USPC .................. 710/74; 711/154; 714/4.11, 6.3; 717/168-170, 174, 175
See application file for complete search history.

(56) References Cited

U.S. PATENT DOCUMENTS

| | | | |
|---|---|---|---|
| 2013/0290945 A1* | 10/2013 | Sawal et al. | H04Q 3/54516 713/100 |
| 2014/0019405 A1* | 1/2014 | Borthakur et al. | G06F 11/1471 707/E17.005 |
| 2018/0052750 A1* | 2/2018 | Sun et al. | G06F 3/0688 |
| 2018/0246663 A1 | 8/2018 | Yamamoto et al. | |
| 2019/0087112 A1 | 3/2019 | Yamamoto et al. | |
| 2019/0332282 A1* | 10/2019 | Urakami et al. | H04L 43/20 |
| 2022/0129444 A1* | 4/2022 | Chien et al. | G06F 13/4027 |

FOREIGN PATENT DOCUMENTS

WO    2018/158808 A1    9/2018

* cited by examiner

*Primary Examiner* — Ilwoo Park
(74) *Attorney, Agent, or Firm* — Procopio, Cory; Hargreaves & Savitch LLP (57) ABSTRACT

The invention is to efficiently exchange storage programs. A storage program in an active state and a storage program in a standby state in a storage program group each change metadata thereof when the storage program in the active state writes data. When update of the storage programs including arranging post-update storage programs in storage nodes and generating new-version metadata based on old-version metadata by the post-update storage programs is to be performed, the post-update storage program in the standby state generates the new-version metadata based on the old-version metadata is performed for the storage programs in the plurality of storage nodes while replacing the active state and the standby state of the storage programs with each other in the plurality of storage programs in the storage program group.

8 Claims, 8 Drawing Sheets

STORAGE SYSTEM AND STORAGE PROGRAM UPDATE METHOD

BACKGROUND OF THE INVENTION

1. Field of the Invention

The present invention relates to a storage system and a storage program update method.

2. Description of the Related Art

In a software defined storage (SDS), which is a storage device, it is necessary to continuously provide a function (IO function) of inputting and outputting data unless an explicit stop instruction is given from a user. On the other hand, it may be necessary to add or modify a function in a storage program that runs in the storage device to provide the IO function. Therefore, it is necessary to enable to exchange the storage program while continuously providing the IO function to the user. If a map of metadata used by the storage program is the same before and after the exchange, the exchange can be performed by replacement of the storage program, but when the map is changed before and after the exchange, the exchange of the map is necessary in addition to the replacement of the storage program. In this case, it is necessary to continuously provide the IO function while exchanging the map.

For example, in WO2018/158808, when a storage program is to be exchanged in an SDS including a plurality of computers, a volume of a computer on which the storage program to be exchanged runs is moved to another computer. All the volumes of the computer are moved to the other computer, and a storage program running on the computer is newly started in a state without volumes on the computer, thereby realizing the exchange of the storage program accompanied by the metadata map change while continuously provide the IO function. Specifically, WO2018/158808 discloses that "the information system according to one embodiment of the present invention comprises: a first computer which is a software defined storage (SDS) equipped with a virtualization function; and a second computer being an SDS. Due to the virtualization function, the first computer is able to provide a logical volume that uses, as a storage region, a volume included in the second computer. Upon accepting an instruction to install a storage control program on the second computer, this information system identifies, from among logical volumes included in the first computer, the logical volume that uses, as the storage region, the volume included in the second computer, and then moves data stored in the volume that is included in the second computer and that is being used as the storage region by the identified logical volume to a storage device of the first computer. The information system subsequently installs the storage control program on the second computer."

In WO2018/158808, the volume of the computer in which the storage program is to be exchanged is moved to another computer. At this time, the other computer is required to have an unused storage capacity for moving the volume. In the method proposed in WO2018/158808, a plurality of storage programs can be exchanged at the same time, but the unused storage capacity required for the exchange increases when the number of programs to be exchanged at the same time increases. In addition, it is necessary to continuously provide the IO function during the volume movement. When a communication band used for the volume movement and a communication band used for providing the IO function are the same, it may be necessary to limit the communication band and the like used for the volume movement to prevent degradation of performance of the IO function. Not limited to the communication band, limitation may be required when a compute resource is shared between the volume movement and the IO function provision. When the limitation is small, an influence on the IO performance becomes large, and when the limitation is large, time required for the volume movement and time required for the exchange of the storage program become long.

An object of the invention is to eliminate necessity of resources such as a surplus unused storage capacity for exchange, prevent IO performance from being greatly affected, and shorten time required for the exchange.

SUMMARY OF THE INVENTION

In order to achieve the above purpose, typical storage system and storage program update method of the invention include: a storage device configured to store data; and a plurality of storage nodes each including a processing unit configured to execute a storage program for performing input and output processing of data to and from the storage device. The storage program accesses data of the storage device using metadata and stores the metadata in a memory of the storage nodes. The plurality of storage programs arranged in a plurality of different nodes constitute a storage program group by a storage program in an active state for performing input and output processing of data to and from the storage device and a storage program in a standby state for taking over the processing when a failure occurs in the storage program in the active state. The storage program in the active state and the storage program in the standby state in the storage program group each change the metadata thereof when the storage program in the active state writes the data. When update of the storage programs including arranging post-update storage programs in the storage nodes and generating new-version metadata based on old-version metadata by the post-update storage programs is to be performed, the post-update storage programs in the standby state generate the new-version metadata based on the old-version metadata for the storage programs in the plurality of storage nodes while replacing the active state and the standby state of the storage programs with each other in the plurality of storage programs in the storage program group.

The invention can efficiently exchange storage programs while continuing input and output processing. Problems, configurations, and effects other than those described above will be clarified by the following description of embodiments.

DESCRIPTION OF THE PREFERRED EMBODIMENTS

A configuration and function of an example according to an embodiment of the invention will be described with reference to the drawings.

Embodiment 1

Figure 1:
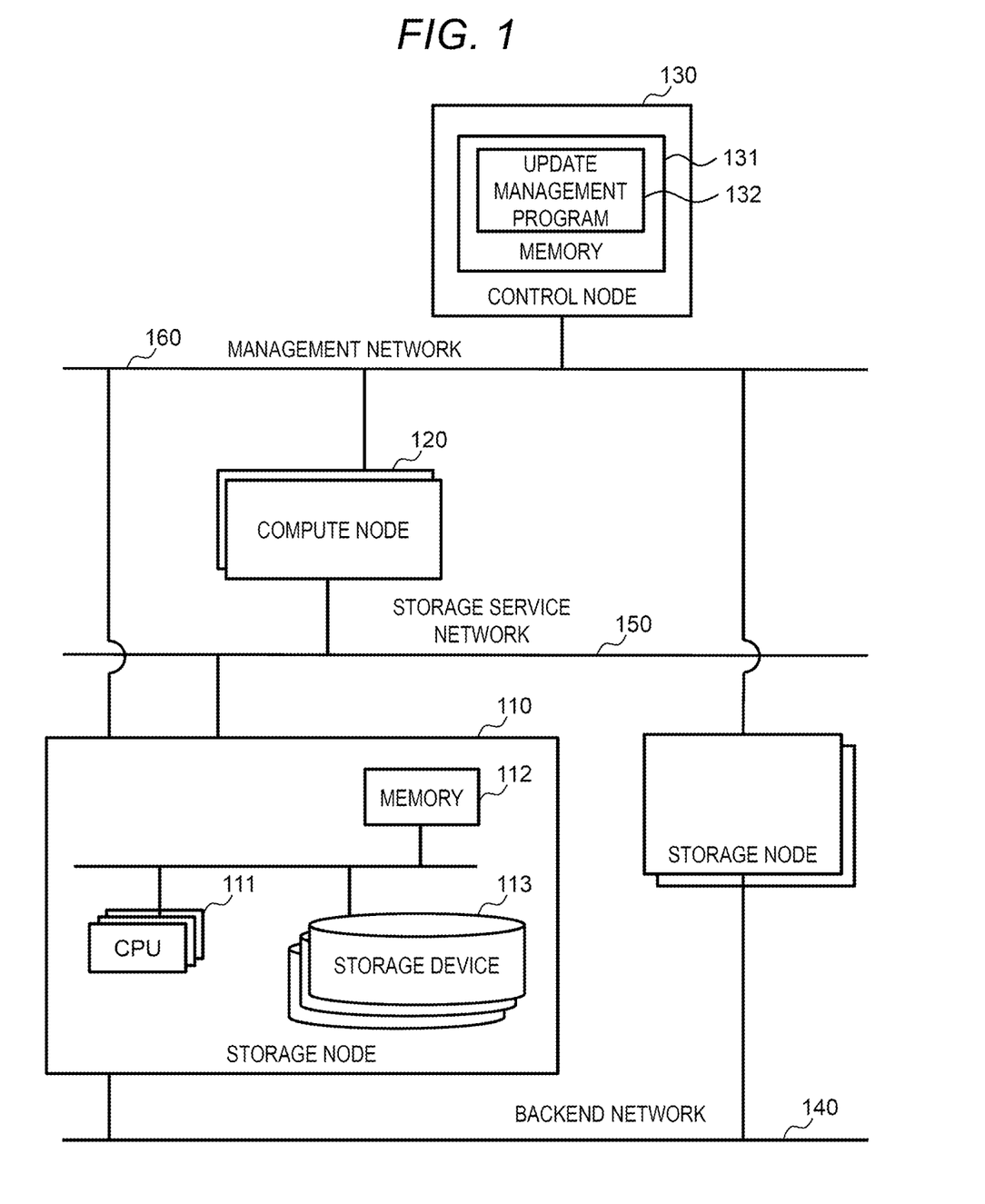
FIG. 1 is a device configuration diagram showing an environment according to Embodiment 1 of the invention.

FIG. 1 shows a configuration of a system according to Embodiment 1.

The system includes three or more storage nodes 110, one or more compute nodes 120, and one control node 130, and includes a backend network 140 that connects the storage nodes 110, a storage service network 150 that connects the storage nodes 110 and the compute nodes 120, and a management network 160 that connects the control node 130, the compute nodes 120, and the storage nodes 110. A part or all of the storage nodes 110, the compute nodes 120, and the control node 130 may be the same server. A part or all of the backend network 140, the storage service network 150, and the management network 160 may be the same network.

Each storage node 110 includes one or more CPUs 111, a memory 112, and one or more storage devices 113.

The control node includes a memory 131. The memory 131 includes an update management program 132.

Figure 2:
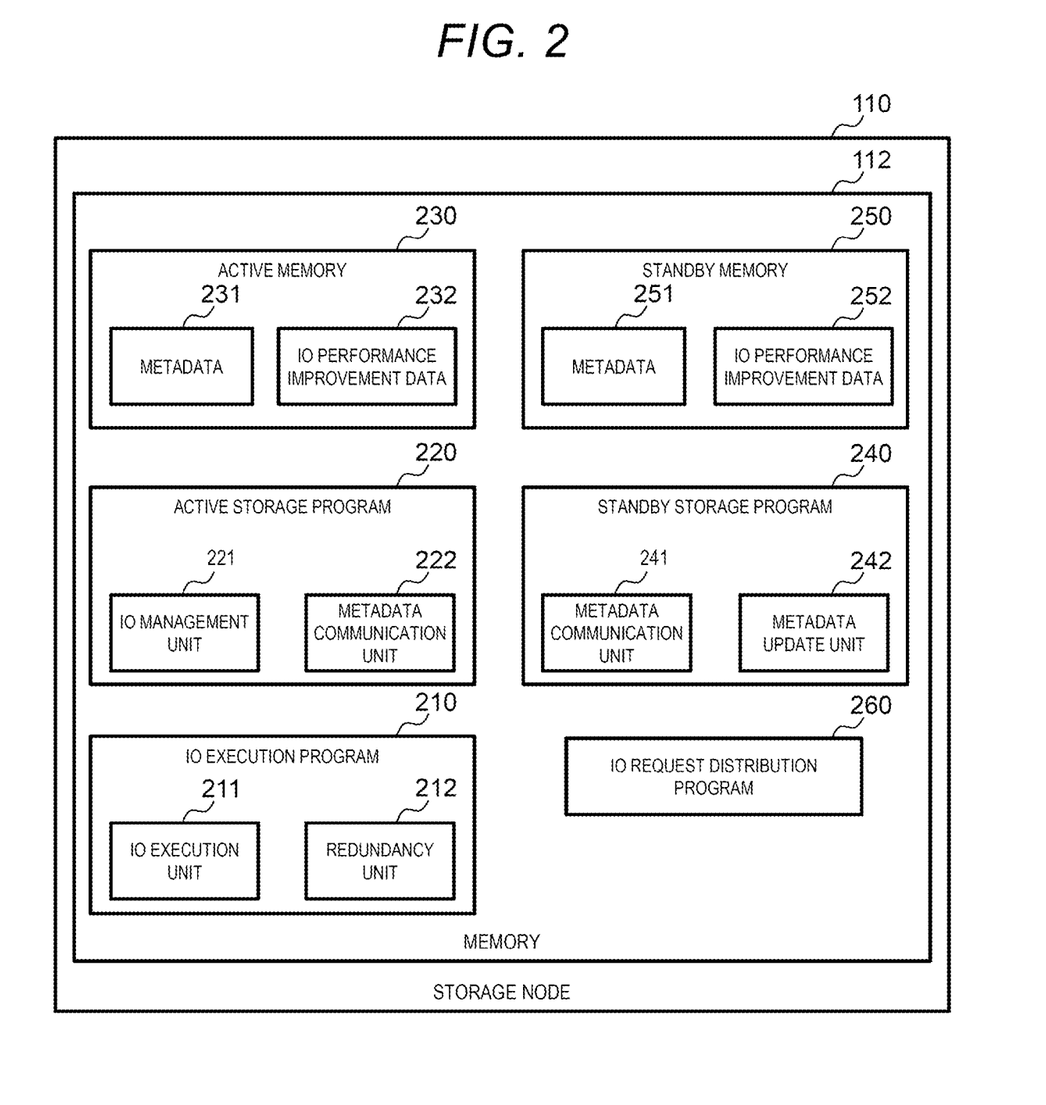
FIG. 2 is a memory configuration diagram of a storage node.

FIG. 2 shows a configuration of the memory 112 of the storage node 110.

The memory 112 includes an IO execution program 210, an active storage program 220, an active memory 230 that is a memory used by the active storage program 220, a standby storage program 240, a standby memory 250 that is a memory used by the standby storage program, and an IO request distribution program 260.

The IO execution program 210 includes an IO execution unit 211 and a redundancy unit 212.

The active storage program 220 includes an IO management unit 221 and a metadata communication unit 222. The active memory 230 includes metadata 231 and IO performance improvement data 232.

The standby storage program 240 includes a metadata communication unit 241 and a metadata update unit 242. The standby memory 250 includes metadata 251 and IO performance improvement data 252.

Figure 3:
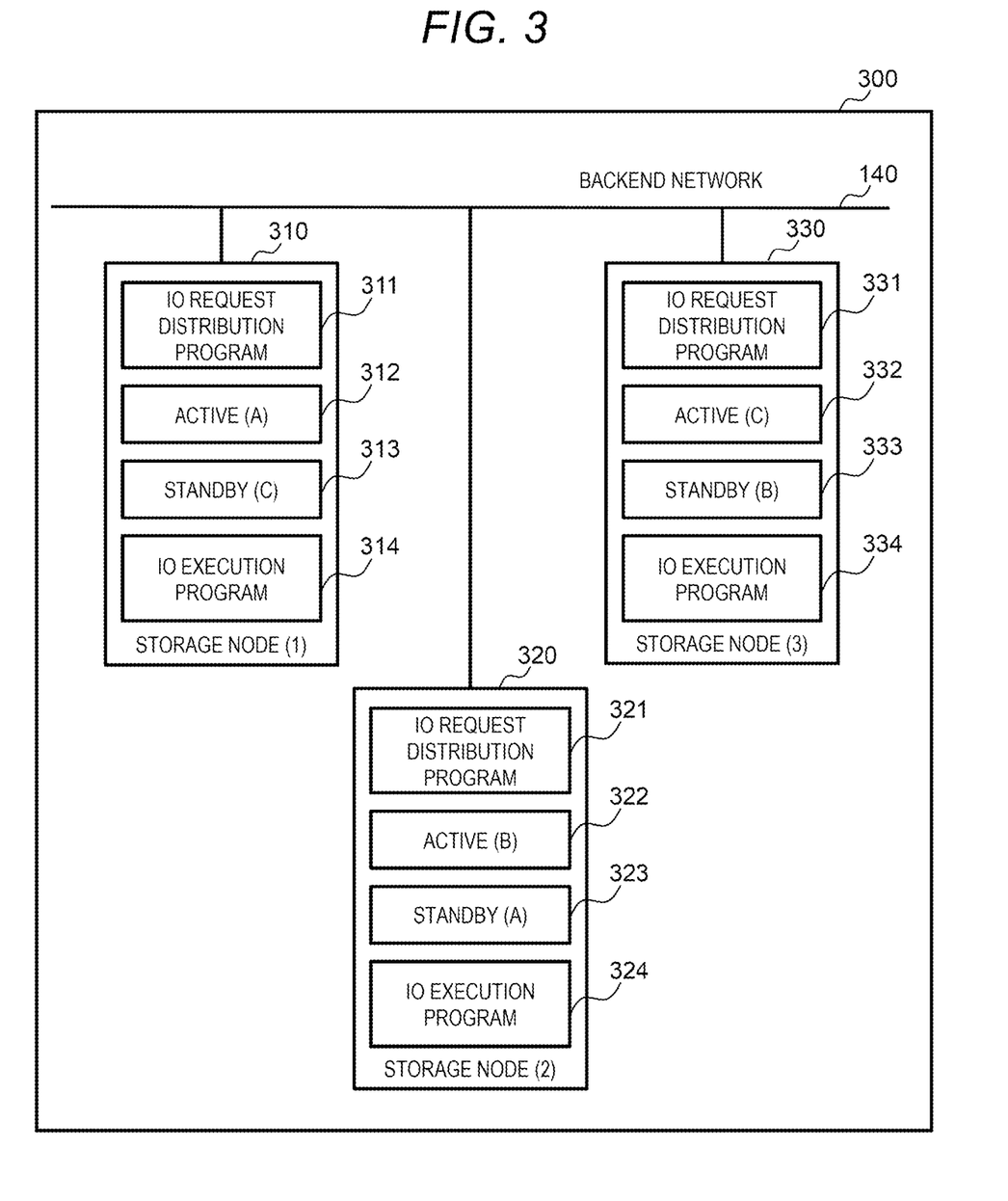
FIG. 3 is an arrangement diagram of active storage programs and standby storage programs.

FIG. 3 shows a redundancy configuration example 300 using the active storage programs and the standby storage programs in the system. In FIG. 3, the active storage program is referred to as active, and the standby storage program is referred to as standby.

Each active storage program is paired with one or more standby storage programs running in a storage node other than the storage node in which the program runs. An active storage program (A) 312 running in a storage node (1) 310 runs in pair with a standby storage program (A) 323 running in a storage node (2) 320.

Operation of the active storage program and the standby storage program will be described.

The active storage program receives and processes an IO request issued by each compute node 120. The system needs to continuously provide the IO function to the compute node even when a failure occurs in the storage node or the active storage program and the active storage program becomes inoperable. When the active storage program becomes inoperable, one of the standby storage programs paired with the active storage program changes the state to active, and executes subsequent IO requests.

For example, when a failure occurs in the storage node (1) 310, the active storage program (A) 312 becomes inoperable. At this time, the standby storage program (A) 323 in the storage node (2) 320 paired with the storage program changes the state to the active storage program. The IO request received and processed by the active storage program (A) 312 until the occurrence of the failure is thereafter received and processed by the active storage program (A) 323 in the storage node (2) 320.

An IO processing flow in the system will be described.

For example, the IO request issued by the compute node 120 is received by an IO request distribution program 331 in a storage node (3) 330. The IO request distribution program 331 detects a storage node having an active storage program that manages an execution target of the received IO request. When the execution target of the received IO request is managed by the active storage program (A) 312, the storage node (1) 310 is detected. The IO request distribution program 331 distributes the IO request to the IO request distribution program 311 running in the detected storage node (1) 310.

The IO request distribution program 311 distributed with the IO request notifies the distributed IO request to the active storage program (A) 312 in the same storage node (1) 310. The IO management unit of the active storage program (A) 312 requests the IO execution program 314 to execute IO. The active storage program (A) 312 asynchronously processes a plurality of IO requests using the IO performance improvement data, and increases the number of detected execution targets and the number of IO execution requests within a unit time, thereby improving the IO performance.

The active storage program (A) 312 refers to and updates the metadata in the active memory, which is the memory included in the active storage program (A) 312, at the time of the IO execution request.

In order for the standby storage program to change the state to the active storage program and to continuously manage the IO at the time of a failure, the metadata in the active memory needs to match the metadata in the standby memory used by the standby storage program paired with the active storage program.

Therefore, when the metadata is to be updated, the active storage program (A) 312 transmits update content to the paired standby storage program (A) 323 by the metadata communication unit . When metadata update information is received, the metadata communication unit of the standby storage program (A) 323 reflects the update to the metadata of the standby memory by the metadata update unit.

The IO execution program 314 requested by the active storage program (A) 312 to execute the IO detects the storage device of the IO execution target and executes the IO on the storage device. At this time, in order to guarantee data access without causing data loss even when a failure occurs in the storage node (1) 310 or the storage device of the IO execution target, the redundancy unit of the IO execution program 314 stores data that enables recovery of the IO in a storage device in a storage node different from the storage node that stores the storage device in which the IO execution unit performs the IO. For example, when data is guaranteed by mirroring, the IO execution program 314 requested to execute IO executes the IO on the storage device in the storage node (1) 310, and transmits the IO information to the IO execution program 334 running in the storage node (3) 330. The IO execution program 334 stores the information in the storage device of the storage node (3) 330. A data guarantying method may be mirroring, distributed parity, or any other method. Pair arrangement of the storage programs and redundant configuration arrangement of the IO execution program may or may not be associated with each other.

Figure 4:
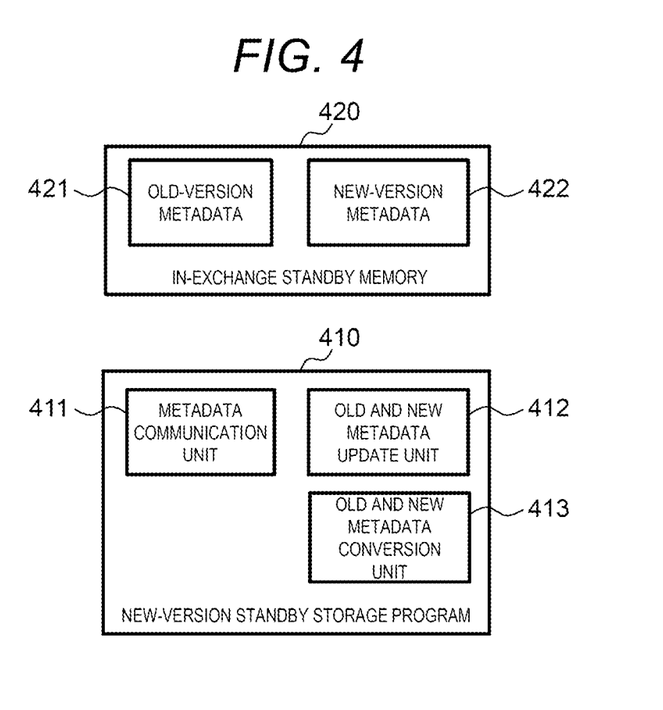
FIG. 4 is a memory configuration diagram of the standby storage program during exchange of the storage programs.

FIG. 4 shows configurations of a new-version standby storage program included in a memory of a storage node in which a memory map used by a storage program is being exchanged, and an in-exchange standby memory which is a memory used by the new-version standby storage program during the exchange.

Hereinafter, the program before the exchange is described as an old-version program, and the program sifter the exchange is described as a new-version program.

A new-version standby storage program 410 includes a metadata communication unit 411, an old and new metadata update unit 412, and an old and new metadata conversion unit 413.

An in-exchange standby memory 420, which is a memory used by the new-version standby storage program 410 during the exchange, includes old-version metadata 421 and new-version metadata 422. The standby storage program does not execute the 10, and thus does not use IO performance improvement data. During the exchange, the new-version metadata is stored in an area secured for the IO performance improvement data.

A new-version active storage program, which is obtained by the new-version standby storage program 410 changing the state thereof to perform IO management, can run in a new-version mode while accessing the new-version metadata 422, and can run in an old-version mode while accessing the old-version metadata 421. At this time, the metadata of the unselected version is discarded, and the IO performance improvement data is stored in the corresponding area.

Figure 5:
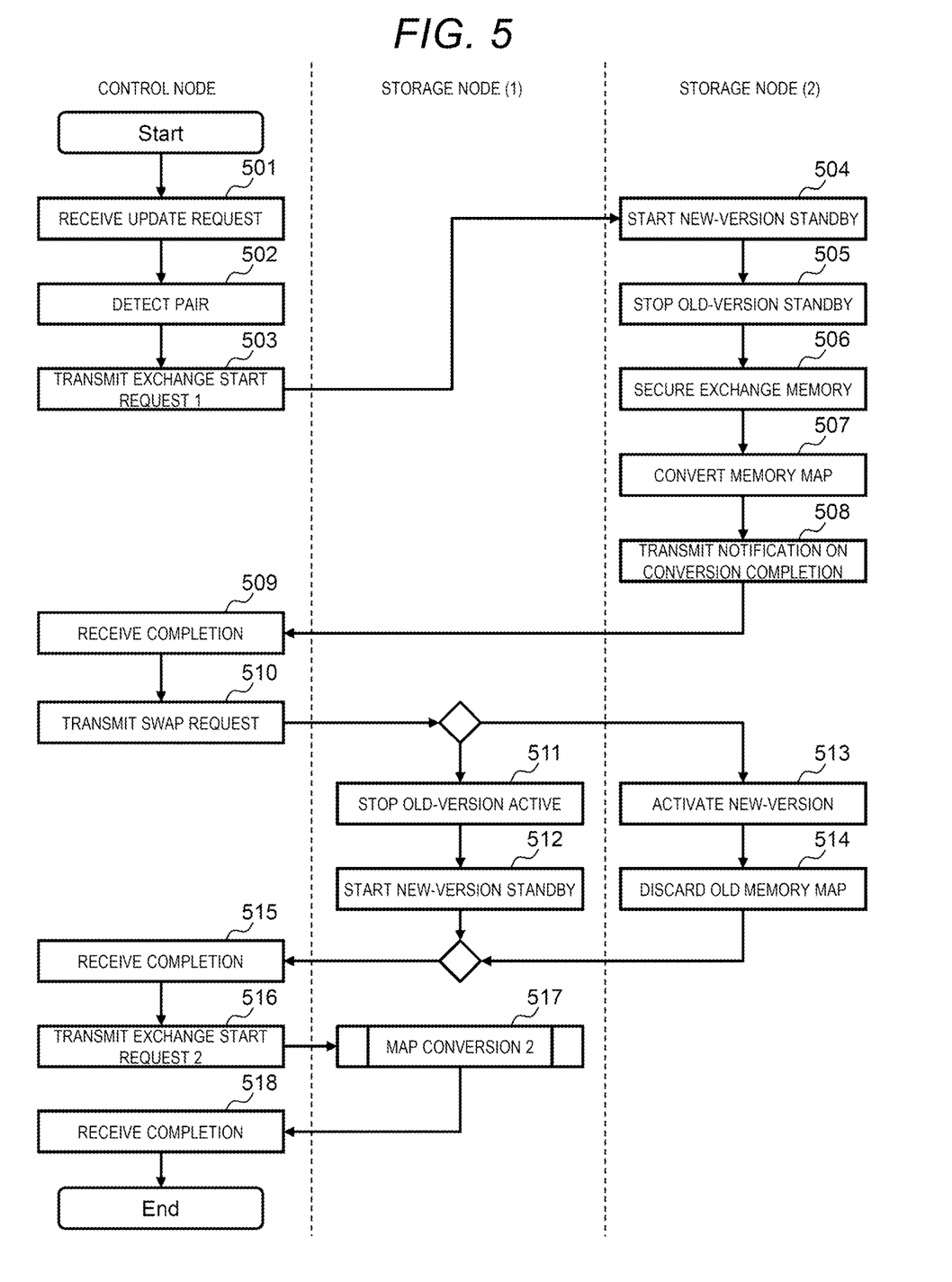
FIG. 5 is a flowchart of the exchange of the storage programs according to Embodiment 1.

FIG. 5 shows a version exchange flow of the storage programs.

The update management program 132 of the control node 130 receives an update request from a user (step 501).

The update management program 132 detects a pair of storage programs running in the old version, which are exchange targets, from the system (step 502). FIG. 5 shows a flow when the active storage program is running in the storage node (1) and the paired standby storage program is running in the storage node (2).

An exchange start request 1 is transmitted to the standby storage program of the detected pair (step 503). When the pair includes one active storage program and a plurality of standby programs, a request may be transmitted to all the standby storage programs, or a request may be transmitted to a part of the standby storage programs.

In the storage node (2) which has received the exchange start request 1, the new-version standby storage program is started (step 504). At the time when the start of the new-version standby storage program is completed, the running old-version standby storage program is stopped (step 505).

The new-version standby storage program secures the IO performance improvement data area in the standby metadata as a new-version metadata area (step 506).

The old and new metadata conversion unit 413 in the new-version standby storage program 410 reads the old-version metadata 421 in the standby memory, converts the old-version metadata 421 to the new-version metadata, and stores the new-version metadata in the secured new-version metadata area (step 507). During the map exchange process, the old-version active storage program paired with the new-version standby storage program executes the IO. Even during the map exchange, the new-version standby storage program receives a metadata update request from the old-version active storage program. The old and new metadata update unit 412 stores the data in the old-version metadata 421, converts the data to new-version metadata, and stores the new-version metadata also in the secured new-version metadata area.

When the memory map conversion is completed, the completion is notified to the control node (step 508). The control node receives the completion notification (step 509).

When the pair detected in step 502 has a plurality of standby storage programs and the old-version standby storage program remains in the pair, the control node executes steps 503 to 509. The processing is repeated until no old-version standby storage programs are in the pair.

The control node transmits a swap request to the old-version active storage program of the pair detected in step 502 and one new-version standby storage program in the pair (step 510).

When the swap request is received, the storage node (1) stops the processing of the old-version active storage program (step 511), and switches the processing to the new-version standby storage program (step 512). When the start of the new-version standby storage program is fast, the new-version standby storage program may be started after the active storage program is stopped, or the new-version standby storage program may be started previously when the swap request is received so that the processing can be switched to the new-version standby storage program when the active storage program is stopped. When the processing is completed, the completion is notified to the control node.

When the swap request is received, the storage node (2) changes a state of the new-version standby storage program to the active storage program (step 513). The change is hereinafter referred to as activation. By the activation, a memory used for the standby storage program is used as a memory for the active storage program. At this time, the old-version metadata is discarded, and the corresponding area is used as an IO performance improvement data storage area (step 514). When the processing is completed, the completion is notified to the control node.

The swap processing from steps 511 to 514 is completed within a time shorter than a timeout time set in the IO executed in the compute node. Therefore, influence of the processing is not observed from the compute node.

The control node receives the completion notification of the swap processing from the storage node (1) and the storage node (2) (step 515). The control node transmits an exchange start request 2 to the new-version standby storage program started by the swap processing (step 516).

The new-version standby storage program which has received the exchange start request 2 executes processing of map conversion 2 (steps 506 to 508) (step 517).

When the control node receives the completion notification (step 518), the control node completes the exchange.

When a failure occurs in the active storage program or the storage node in which the active storage program runs during the exchange and the active storage program becomes inoperable, the new-version standby storage program during the exchange is activated.

When the failure occurs in a state in which the memory map conversion of the standby storage program from step 501 to step 509 is incomplete, the new-version standby storage program discards the new-version metadata and uses the area as the IO performance improvement data storage area. At this time, the activated new-version active storage program runs in the old-version mode while accessing the old-version metadata.

When the failure occurs in a state in which the memory map conversion caused by the exchange start request, 1 in step 510 and subsequent steps is completed, the new-version standby storage program discards the old-version metadata and uses the corresponding area as the IO performance improvement data storage area. At this time, the activated new-version active storage program runs in the new-version mode while accessing to the new-version metadata.

When only the storage programs are to be exchanged, since an active storage program that receives a certain IO request always exists, the programs can be exchanged while maintaining an IO redundancy without stopping the 10.

When the storage programs and the IO execution programs are to be exchanged at the same time, the redundancy unit of the IO execution program may have no communication targets until the exchange of the program is completed. Although the exchange can be performed without stopping the IO, the IO redundancy decreases. The data updated during the exchange is made redundant again after the exchange is completed, but the IO performance is affected during the re-redundancy processing.

When the exchange of the storage program and the exchange of the IO request distribution program are to be performed at the same time, the access from the control node to the program is disabled during the exchange of the IO request distribution program, but the IO can be continuously executed by issuing the IO request to the IO request distribution program running on another storage node. By switching the access path from the control node, the IO can be continued, and the 1.0 redundancy is maintained.

Figure 6:
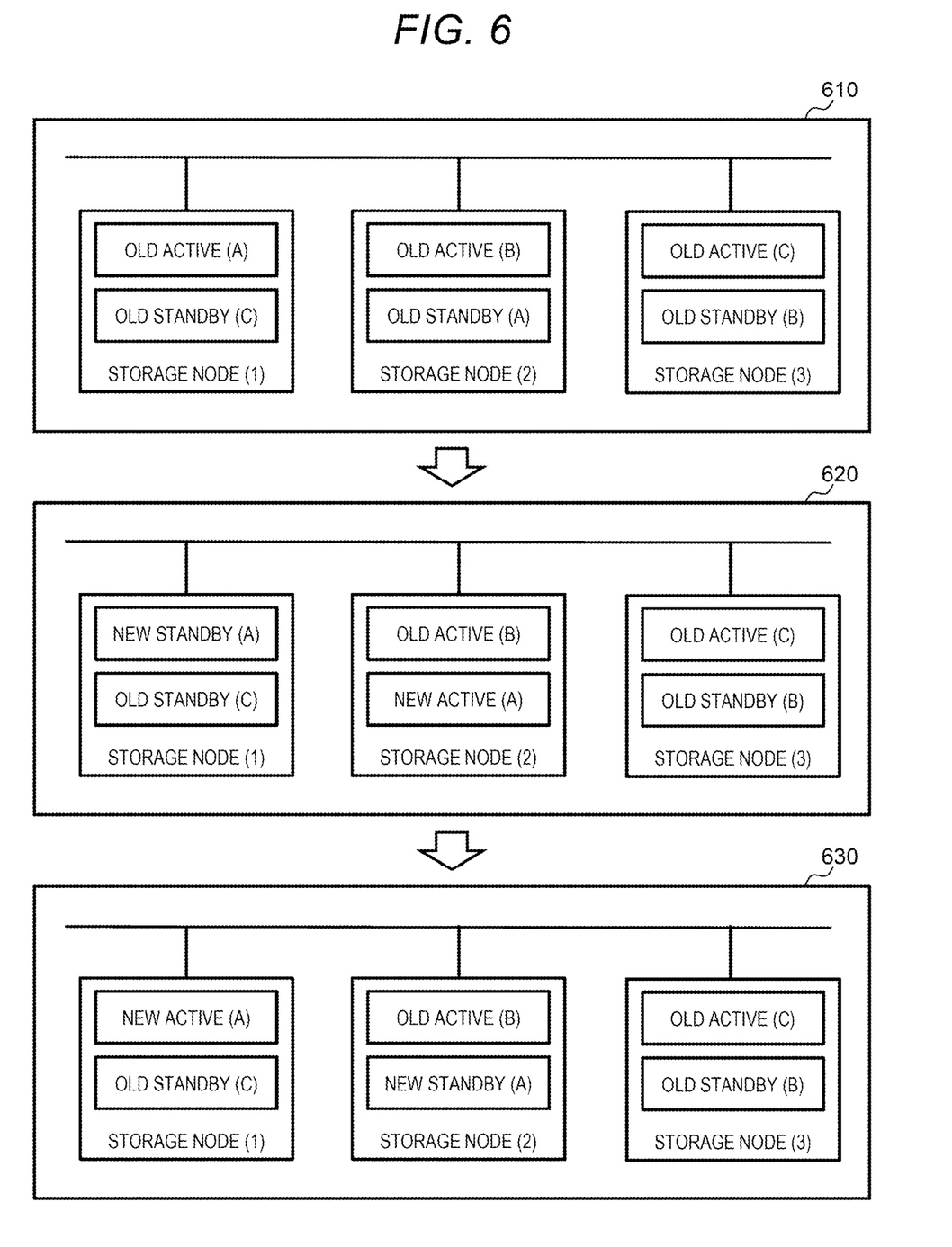
FIG. 6 is an arrangement diagram of the active storage program and the standby storage program before and after the exchange according to Embodiment 1.

FIG. 6 show an arrangement of the active storage programs and the standby storage programs in the system before and after the exchange of the storage program. In the figure, the active storage program is referred to as active, the standby storage program is referred to as standby, the new version after the exchange is referred to as new, and the old version before the exchange is referred to as old.

A program arrangement before execution of the exchange flow described in FIG. 5 is indicated by 610, and a program arrangement at the time of completion of the exchange flow is indicated by 620.

The active storage programs use a compute resource such as a CPU when the IO processing is executed. When a plurality of active storage programs run in one storage node and the number of CPUs included in the storage node is not sufficient, the insufficient number of CPUs may reduce the IO performance. When the numbers of CPUs included in the storage nodes in the system are the same, it is desirable that the number of active storage programs running in each storage node is uniform from a viewpoint of CPU use efficiency. When the number of CPUs included in each storage node in the system is non-uniform, the number of running active storage programs may be adjusted according to the number of CPUs. This applies not only to the CPUs but also to computing resources such as a memory and an NIC.

In the arrangement 620, 0 active storage programs run in the storage node (1), two active storage programs run in the storage node (2), and one active storage program runs in the storage node (3). In order to uniformly allocate the number of active storage programs running in the storage nodes, the control node transmits the swap request again to the storage node (1) and the storage node (2) which have swapped the storage programs. A new standby storage program (A) running in the storage node (1) is changed to a new active storage program (A), and the new active storage program (A) running in the storage node (2) is changed to the new standby storage program (A). Accordingly, the number of active storage programs running in the storage nodes in the system is made uniform (arrangement 630).

By performing the exchange flow shown in FIG. 5 and the swap processing performed in 620 to 630 in FIG. 6 on a pair B and a pair C operating in the old version, all the storage programs included in the system can be changed to the new version.

Embodiment 2

Portions of Embodiment 2 different from those of Embodiment 1 will be described.

In Embodiment 2, the number of active storage programs running in the storage nodes in the system is made uniform by continuously performing the exchange of the storage programs instead of the swap processing used in Embodiment 1 (620 to 630 in FIG. 6).

Figure 7:
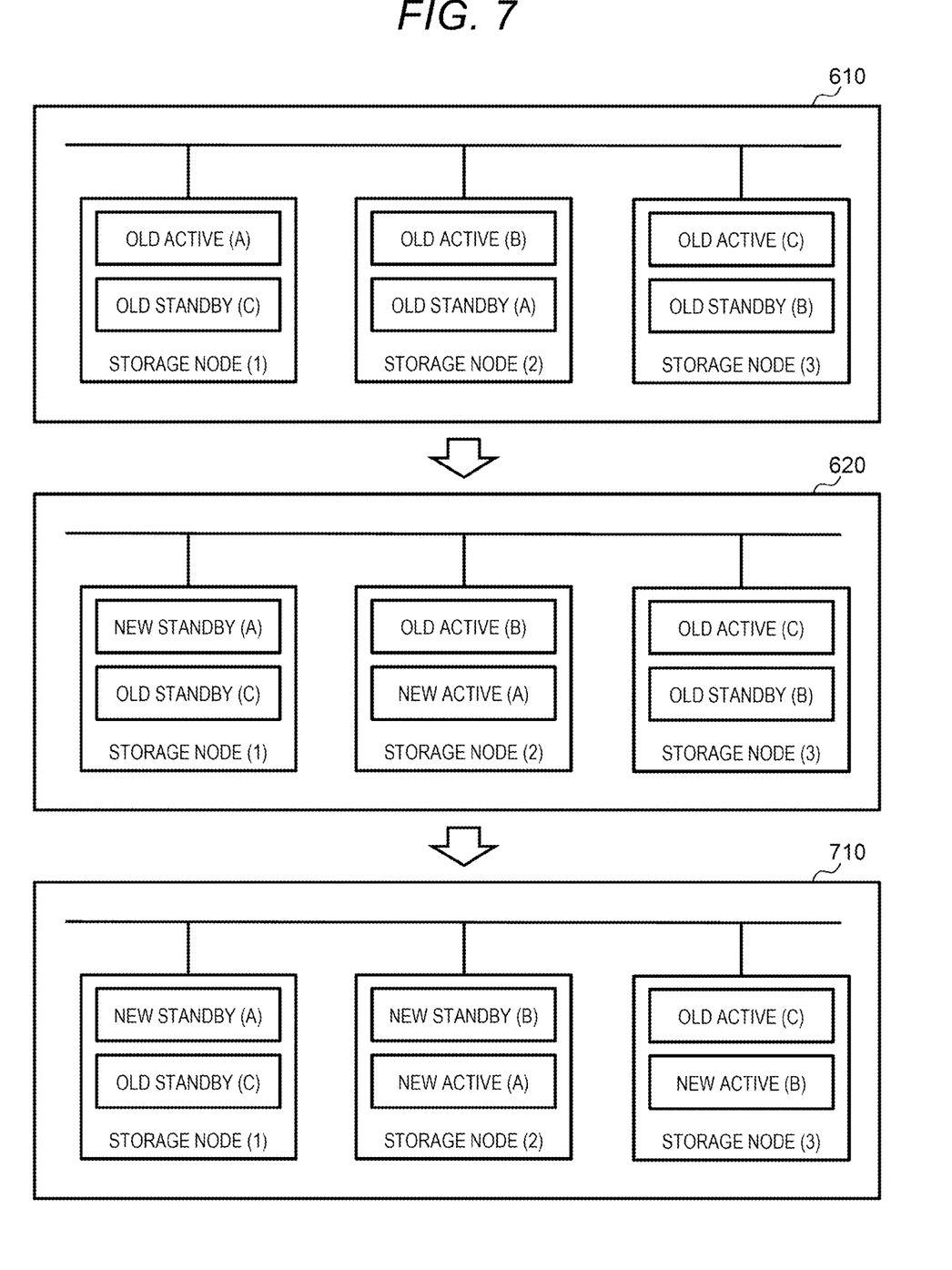
FIG. 7 is an arrangement diagram of active storage programs and standby storage programs before and after exchange according to Embodiment 2.

FIG. 7 shows a program arrangement of Embodiment 2.

The program arrangement before execution of the exchange flow described in FIG. 5 is indicated by 610, and the program arrangement at the time of completion of the exchange flow is indicated by 620.

In the arrangement 620, 0 active storage programs run in the storage node (1), two active storage programs run in the storage node (2), and one active storage program runs in the storage node (3).

The number of active storage programs needs to be uniform to increase CPU utilization efficiency, and the old storage programs in the system all need to be exchanged with new storage programs. As described in the processing flow in FIG. 5, by exchanging the storage programs, the storage nodes in operation exchange the active storage programs and the standby storage programs paired with each other.

In Embodiment 2, by continuously exchanging the storage program from a state of the arrangement 620, the number of active storage programs running in each storage node in the system is made uniform at the time of completion of the program exchange.

In the arrangement 620, the new-version active storage program of the pair A and the old-version active storage program of the pair B run in the storage node (2). The pair B is detected in step 502 of the exchange flow and the exchange flow is performed on the pair B, and thereby the program arrangement becomes as shown in 710.

Specifically, in the pair detection in step 502, storage nodes having a large number of active storage programs running in the same storage node are investigated, and when old-version active storage programs are running in the storage nodes, the pair of the programs is detected.

By performing the processing until all the storage programs running in the system become new versions, the number of active storage programs running in the storage nodes can be made uniform.

Embodiment 3

Portions of Embodiment 3 different from those of Embodiments 1 and 2 will be described.

Figure 8:
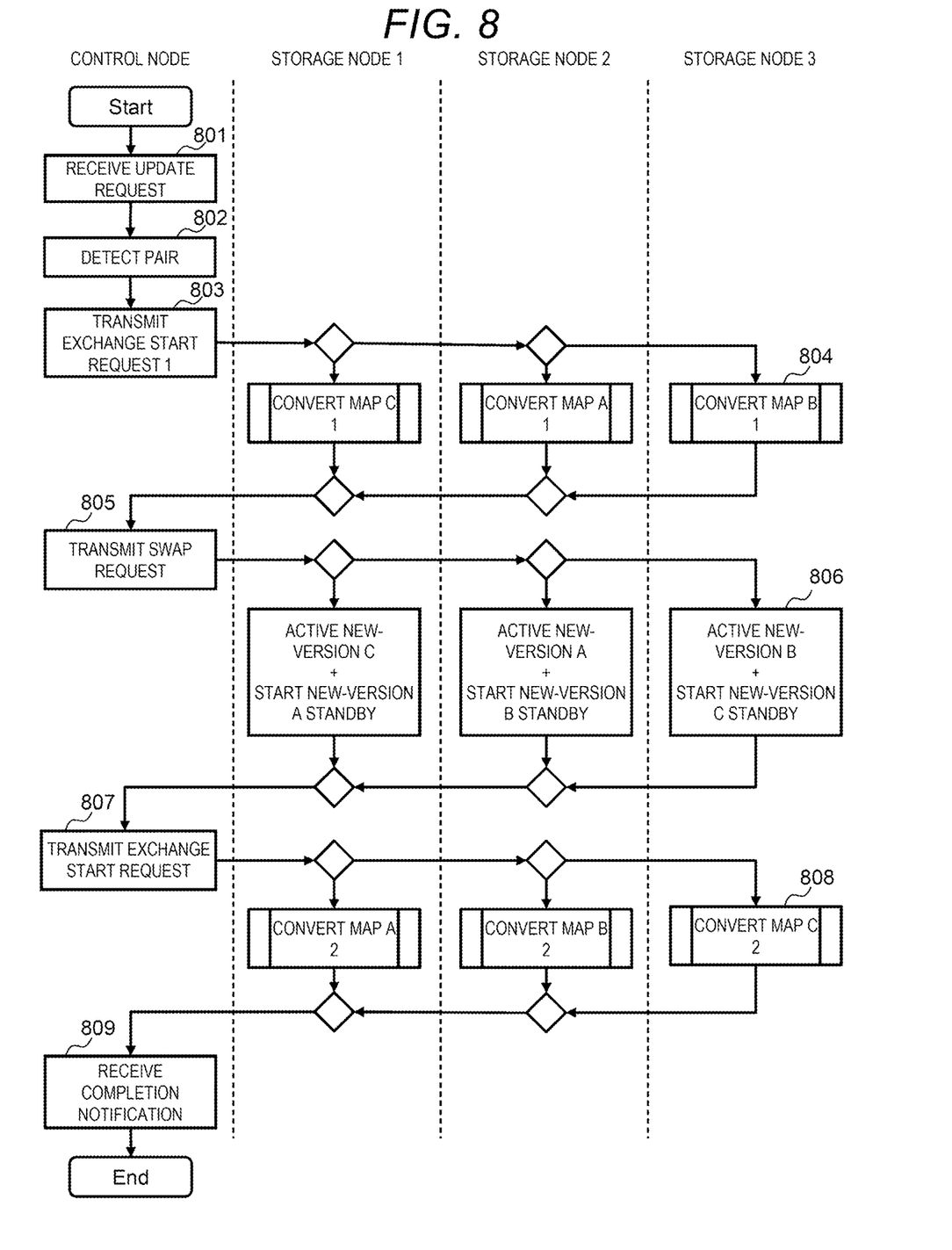
FIG. 8 is a flowchart of exchange of storage programs according to Embodiment 3.

FIG. 8 shows an exchange flow of performing exchange in parallel on all pairs of the storage programs in the system.

The update management program 132 in the control node 130 receives an update request from a user (step 801).

The update management program detects, from the system, pairs of storage programs running in the old version to be exchanged (step 802), and transmits the exchange start request 1 to standby storage programs of all the detected pairs (step 803). When any pair includes one active storage program and a plurality of standby programs, a request may be transmitted to all standby storage programs, or a request may be transmitted to a part of the standby storage programs.

The storage node that has received the exchange start request 1 performs the same processing as that from step 504 to step 508 in FIG. 5 (step 804).

The control node repeats the processing of steps 803 to 804 until no standby storage programs are un-exchanged in the system.

The control node transmits a swap request to an old-version active storage program and one new-version standby storage program of each pair detected in step 802 (step 805). For example, in the case of a configuration shown in 610 in FIG. 6, the new-version activation (steps 513 to 514) and the new-version standby start (steps 511 to 512) are executed at the same time in one storage node (step 806). The control node transmits the swap request so that the arrangement of the active storage programs and the standby storage programs after the exchange is the same as that at the time of the completion in Embodiment 2.

The control node which has received the completion notification of the swap processing transmits the exchange start request 2 to a new-version standby storage program started by the swap processing (step 807).

The new-version standby storage program which has received the exchange start request 2 executes the processing of step 517 (step 808).

When the control node receives the completion notification from all new-version standby storage programs (step 809), the control node completes the exchange of the storage program.

At the time of the completion of the processing, the program arrangement is the same as that in Embodiment 2.

As described above, the disclosed storage system includes: the storage devices 113 configured to store data; and the plurality of storage nodes 110 each including a processing unit (the CPU 111) configured to execute the storage programs for performing input and output processing of data to and from the storage devices. The storage program accesses data of the storage device 113 using the metadata and stores the metadata in a memory of the storage nodes 113. The plurality of storage programs arranged in the plurality of different nodes constitute a storage program group by the storage program in the active state for performing input and output processing of data to and from the storage device 113 and the storage program in the standby state for taking over the processing when a failure occurs in the storage program in the active state. The storage program in the active state and the storage program in the standby state in the storage program group each change the metadata thereof when the storage program in the active state writes the data. When update of the storage programs including arranging post-update storage programs in the storage nodes and generating the new-version metadata based on the old-version metadata by the post-update storage program is to be performed, the post-update storage programs in the standby state generate the new-version metadata based on the old-version metadata for the storage programs in the plurality of storage nodes 110 while replacing the active state and the standby state of the storage programs with each other in the plurality of storage programs in the storage program group.

That is, the area of the memory storing the metadata is the memory map of the metadata. The post-update storage program is the new-version storage program, and the pre-update storage program is the old-version storage program.

The disclosed system uses the new-version storage program which can run as the new-version storage program with reference to the new memory map or as the old-version storage program with reference to the old memory map. The old and new memory maps are converted while the IO is continued by using the program. Since it is necessary to possess the old and new memory maps during the conversion, a memory secured for improving the IO performance (specifically, an area secured for the purpose of improving the input and output performance in the memory), which is not essential for providing the IO function, is temporarily released, and the new memory map is stored in the corresponding area.

In an SDS having an active-standby configuration, the standby storage program does not perform IO in a normal state. According to the present method, by exchanging the standby storage program with the new-version storage program, the active storage program and the standby storage program are replaced with each other. After the replacement, the standby storage program is exchanged to the new version, and the memory map is converted. Accordingly, the memory maps of both the active and the standby storage programs are exchanged to new versions, and each program can run as the new-version storage program.

In this way, by performing the conversion of the memory map by only the standby storage program which does not provide the IO function, the storage programs can be exchanged efficiently while continuing the IO without affecting the IO performance.

When it is necessary to switch from the standby state to the active state during the processing of converting the old-version metadata to the new-version metadata (during the conversion of the memory map), the new-version storage program discards the new-version metadata stored in the corresponding area and uses the corresponding area for the purpose of improving the input and output performance.

In addition, when it is necessary to switch from the standby state to the active state after the completion of the processing of converting the old-version metadata to the new-version metadata (after the conversion of the memory map), the new-version storage program discards the old-version metadata and performs the input and output processing with reference to the new-version metadata.

Therefore, regardless of occurrence of a timing at which the standby state needs to be switched to the active state, the new-version storage program can start the input and output processing using appropriate metadata.

When the active and standby states are replaced and the replacement of both storage programs and the conversion of the memory map are completed, the original performance can be exhibited by returning the state to the original active and standby states as disclosed in Embodiment 1.

In addition, as a result of switching a storage program in the active state to the standby state while activating another storage program belonging to the same group as disclosed in Embodiment 2, when a plurality of storage programs in one storage node are activated, a pre-update storage program among the storage programs in the active state may be selected and shifted to the standby state for update.

In this way, by resolving a situation in which a plurality of active storage programs run in one storage node and sequentially exchanging the storage programs, it is possible to advance the exchange of the storage programs while distributing a load.

In addition, as disclosed in Embodiment 3, the standby storage programs in the plurality of storage nodes may be updated in parallel, and then after all the replaced storage programs become capable of referring to new data for running, the active storage programs in the plurality of storage nodes may be switched to the standby state and updated in parallel.

In this way, by performing the processing in parallel, the replacement of the storage programs can be completed in a short time.

The invention is not limited to the above embodiments, and includes various modifications. For example, the embodiments described above have been described in detail for easy understanding of the invention, and the invention is not necessarily limited to those including all of the configurations described above. The configuration is not limited to being deleted, and the configuration may be replaced or added.

For example, the above embodiments have been described whilebeing exemplified bya pair in which one standby program is associated with one active program, but a group in which a plurality of standby programs are associated wi th one active program may be used as well.

What is claimed is:

1. A storage system, comprising:
a storage device configured to store data; and
a plurality of storage nodes each including a processing unit configured to execute a storage program for performing input and output processing of data to and from the storage device, wherein
the storage program accesses data of the storage device using metadata and stores the metadata in a memory of the storage nodes,
the plurality of storage programs arranged in a plurality of different nodes constitute a storage program group by a storage program in an active state for performing input and output processing of data to and from the storage device and a storage program in a standby state for taking over the processing when a failure occurs in the storage program in the active state,
the storage program in the active state and the storage program in the standby state in the storage program group each change the metadata thereof when the storage program in the active state writes the data, and
when update of the storage programs including arranging post-update storage programs in the storage nodes and generating new-version metadata based on old-version metadata by the post-update storage programs is to be performed,
the post-update storage programs in the standby state generate the new-version metadata based on the old-version metadata for the storage programs in the plurality of storage nodes while replacing the active state and the standby state of the storage programs with each other in the plurality of storage programs in the storage program group.

2. The storage system according to claim 1, wherein
a new-version storage program in the standby state applies, to both the old-version metadata and the new-version metadata, the metadata change due to the data writing of the storage program in the active state in a period in which the post-update storage program in the standby state generates the new-version metadata based on the old-version metadata, and
when a failure occurs in the storage program in the active state and the storage program in the standby state comes into the active state, the storage program accesses data using the old-version metadata applied with the change.

3. The storage system according to claim 1, wherein
in a period in which the post-update storage program in the standby state generates the new-version metadata based on the old-version metadata, the storage program in the active state performs the metadata change due to the data writing on one that is used to access the data, but not on the other, among the old-version metadata and the new-version metadata.

4. The storage system according to claim 1, wherein
the plurality of storage nodes include a first storage node and a second storage node including the storage programs included in the storage program group,
when the post-update storage program in the second storage node is ran and a pre-update storage program in the first storage node is ran in the active state, the post-update storage program in the standby state of the second storage node generates the new-version metadata based on the old-version metadata, and
after the new-version metadata is created in the first storage node, the post-update storage program in the second storage node is switched from the standby state to the active state, and the post-update storage program in the first storage node is ran in the standby state to generate the new-version metadata based on the old-version metadata.

5. The storage system according to claim 3, wherein
the plurality of storage nodes include a first storage node and a second storage node including storage programs included in the storage program group,
when the post-update storage program in the second storage node is ran and a pre-update storage program in the first storage node is ran in the active state, the post-update storage program in the standby state of the second storage node generates the new-version metadata based on the old-version metadata and performs the metadata change due to the data writing on the old-version metadata and the new-version metadata, and the pre-update storage program in the active state of the first storage node changes the old-version metadata, and
after the new-version metadata is created in the first storage node, the post-update storage program in the second storage node is switched from the standby state to the active state, the post-update storage program in the first storage node is ran in the standby state to generate the new-version metadata based on the old-version metadata and to perform the metadata change due to the data writing on the old-version metadata and the new-version metadata, and the pre-update storage program in the active state of the first storage node performs the metadata change due to the data writing on the new-version metadata.

6. The storage system according to claim 1, wherein
the storage program includes a plurality of storage program groups,
the plurality of storage program groups arrange the storage programs in the storage nodes of different combinations, and set the active state and the standby state such that the storage programs in the active state are distributed among the storage nodes, and
when the storage programs are to be updated, the plurality of storage program groups perform switching between the active state and the standby state of the storage programs in conjunction with each other so that the storage programs in the active state are distributed among the storage nodes.

7. The storage system according to claim 1, wherein
the storage nodes each include a memory,
the storage program in the active state temporarily stores input and output data in the memory to improve input and output performance, and
the storage program in the standby state generates the new-version metadata based on the old-version metadata using an area for temporarily storing the input and output data of the memory.

8. A storage program update method by a storage system including:
a storage device configured to store data; and
a plurality of storage nodes each including a processing unit configured to execute a storage program for performing input and output processing of data to and from the storage device, in which
the storage program accesses data of the storage device using metadata and stores the metadata in a memory of the storage nodes,
the plurality of storage programs arranged in a plurality of different nodes constitute a storage program group by a storage program in an active state for performing input and output processing of data to and from the storage device and a storage program in a standby state for taking over the processing when a failure occurs in the storage program in the active state,
the storage program in the active state and the storage program in the standby state in the storage program group each change the metadata thereof when the storage program in the active state writes the data, the storage program update method comprising:
when update of the storage programs including arranging post-update storage programs in the storage nodes and generating new-version metadata based on old-version metadata by the post-update storage programs is to be performed,
the post-update storage programs in the standby state generating the new-version metadata based on the old-version metadata for the storage programs in the plurality of storage nodes while replacing the active state and the standby state of the storage programs with each other in the plurality of storage programs in the storage program group.

* * * * *